United States Patent [19]
Cole et al.

[11] Patent Number: 5,186,847
[45] Date of Patent: Feb. 16, 1993

[54] METHODS OF PREPARING AND USING SUBSTANTIALLY DEBRIS-FREE GELLED AQUEOUS WELL TREATING FLUIDS

[75] Inventors: R. Clay Cole, Duncan; Bobby K. Bowles, Comanche, both of Okla.

[73] Assignee: Halliburton Company, Duncan, Okla.

[21] Appl. No.: 647,866

[22] Filed: Jan. 30, 1991

[51] Int. Cl.$^5$ .................. B01F 3/12; E21B 43/27
[52] U.S. Cl. .................. 252/8.551; 252/8.553; 252/363.5; 536/87; 166/308
[58] Field of Search .................. 536/87; 166/308; 252/8.551, 8.553, 363.5

[56] References Cited

U.S. PATENT DOCUMENTS

| | | | |
|---|---|---|---|
| 2,834,777 | 5/1958 | Jullander | 536/87 |
| 4,276,414 | 6/1981 | Tessler | 536/114 |
| 4,357,248 | 11/1982 | Berkshire et al. | 252/8.55 B |
| 4,392,964 | 7/1983 | House et al. | 507/114 |
| 4,420,406 | 12/1983 | House et al. | 252/8.551 |
| 4,435,564 | 3/1984 | House | 507/114 X |
| 4,439,333 | 3/1984 | House et al. | 507/114 |
| 4,459,214 | 7/1984 | House et al. | 507/114 |
| 4,476,032 | 10/1984 | House et al. | 507/114 X |
| 4,496,468 | 1/1985 | House et al. | 507/114 |
| 4,566,976 | 1/1986 | House et al. | 507/114 |
| 4,566,977 | 1/1986 | Hatfield | 507/114 |
| 4,582,614 | 4/1986 | House et al. | 507/114 |
| 4,602,683 | 7/1986 | Meyers | 166/279 |
| 4,686,051 | 8/1987 | House et al. | 507/114 X |
| 4,741,400 | 5/1988 | Underdown | 166/279 |

*Primary Examiner*—Gary L. Geist
*Attorney, Agent, or Firm*—Thomas R. Weaver; C. Clark Dougherty, Jr.

[57] ABSTRACT

The present invention relates to methods of preparing and using substantially debris-free gelled aqueous well treating fluids containing a cellulose gelling agent. The preparation methods comprise the steps of forming a gelled aqueous fluid and then mixing an amine phosphonate compound therewith to cause the hydration of unhydrated gelling agent remaining therein.

19 Claims, No Drawings

METHODS OF PREPARING AND USING SUBSTANTIALLY DEBRIS-FREE GELLED AQUEOUS WELL TREATING FLUIDS

BACKGROUND OF THE INVENTION

1. Field of the Invention

The present invention relates generally to gelled aqueous well treating fluids, and more particularly, to methods of preparing and using such fluids which are substantially debris-free.

2. Description of the Prior Art

Gelled well treating fluids are utilized in a variety of oil and gas well treatments, e.g., stimulation treatments such as fracturing and acidizing, gravel packing treatments to prevent sand and other loose materials from flowing from the producing formation into the well bore, enhanced hydrocarbon recovery processes, etc. Generally, a filterable gel which leaves minimal residue or debris in the treated formation is desirable, and in some treatments such as gravel packing, it is critical that the gelled treating fluid be substantially debris-free. If not, the debris left in a gravel packed formation can plug the permeability of the gravel pack and/or portions of the formation and reduce or terminate the production of hydrocarbons therefrom.

In the preparation of viscous aqueous well treating fluids, a solid gelling agent such as hydroxyethylcellulose is commonly mixed with water to form a viscous gelled aqueous fluid. The term "water" is used herein to mean fresh water, salt water, oil field brines, seawater and other similar aqueous fluids commonly used in oil field treating applications. The hydration and dissolution of the gelling agent and in particular, hydroxyethylcellulose, in the water leaves two types of formation damaging debris in the gelled fluid. The first type, commonly known as micro-fisheyes, are fragments of the solid gelling agent surrounded by an unhydrated gellatinous layer. The second type of debris is non-hydratable particles of raw gelling agent or amorphous debris.

To produce a hydroxyethylcellulose gelled well treating fluid relatively free of debris, it has heretofore been conventional practice to subject the gelled aqueous fluid produced after conventional mixing and hydration to additional high shear mixing so that the gelling agent debris is more thoroughly dispersed and hydrated, and then to filtration to remove substantially all of the remaining micro-fisheyes and unhydratable particles. These extra steps of shearing and filtering the gelled treating fluid after its formation are time consuming and expensive. Also, if the additional high shear mixing results in too much or too little shearing, the gelled aqueous fluid can lose its viscosity and/or still contain debris.

Thus, there is a need for a method of preparing and using substantially debris-free gelled aqueous well treating fluids whereby, depending upon the application to which the treating fluid is to be put, one or more of the steps of high shear mixing and filtering of the treating fluid can be omitted.

SUMMARY OF THE INVENTION

The present invention provides methods of preparing and using gelled aqueous well treating fluids which are substantially debris-free wherein the step of subjecting the treating fluid to high shear mixing prior to its use is not required. Depending upon the particular application in which the treating fluid is to be used, the step of filtering the treating fluid can also often be omitted.

In accordance with the methods of this invention, a hydratable gelling agent such as a cellulose derivative, preferably hydroxyethylcellulose, is mixed with the water used using conventional mixing apparatus in an amount sufficient to form a gelled aqueous fluid of desired viscosity. An amine phosphonate compound is then combined with said gelled aqueous fluid in an amount sufficient to cause the hydration of unhydrated gelling agent remaining therein.

The presence of the amine phosphonate compound in the water causes the gelling agent to be hydrated to such an extent that subjecting the resulting gelled fluid to high shear mixing is unnecessary. In applications where some debris in the treating fluid can be tolerated, the step of filtering the treating fluid is also unnecessary.

In a preferred method of the present invention, a substantially debris-free gelled aqueous treating fluid is prepared by first lowering the pH of fresh water to about 3 to 4. A cellulose gelling agent, preferably hydroxyethylcellulose, is mixed with the water in an amount in the range of from about 0.7% to about 12% by weight of the resulting mixture, and the pH of the mixture is raised to about 7. The mixing of the mixture is continued for a time sufficient to form a homogeneous gelled aqueous fluid followed by the addition of an amine phosphonate compound, preferably diethylenetriaminepenta (methylenephosphonic acid), in an amount in the range of from about 0.1% to about 2.0% by volume of the resulting mixture. The pH of the resulting substantially debris-free aqueous treating fluid formed is again raised to about 7.

Methods of using the substantially debris-free gelled aqueous well treating fluids of this invention for treating subterranean well formations are also provided.

It is, therefore, a general object of the present invention to provide improved methods of preparing and using substantially debris-free gelled aqueous well treating fluids.

Other and further objects, features and advantages of the methods of the present invention will be readily apparent to those skilled in the art upon a reading of the description of preferred embodiments which follows.

DESCRIPTION OF PREFERRED EMBODIMENTS

According to the present invention, improved methods of preparing substantially debris-free gelled aqueous well treating fluids are provided. The methods basically comprise the steps of forming a gelled aqueous fluid by mixing a solid cellulose gelling agent with water followed by combining an amine phosphonate compound with the gelled aqueous fluid in an amount sufficient to cause the hydration of unhydrated gelling agent remaining in the gelled aqueous fluid. Because the amine phosphonate compound lowers the pH of the fluid, the pH is raised to about 7 to provide a neutral substantially debris-free gelled aqueous treating fluid.

If the treating fluid is to be used in subterranean formation treating applications such as gravel packing where it must be essentially debris-free in order to prevent permeability damage, the additional step of filtering the treating fluid can be utilized. Thus, the methods of the present invention for preparing substantially debris-free gelled aqueous well treating fluids are improved over prior art methods in that the step of high shear mixing is not required.

As mentioned above, the water used for forming the gelled aqueous fluid can be fresh water, salt water, oil field brines or seawater. Preferably, fresh water is used, and if it is desirable that the water contain salt, e.g., sodium chloride, it is dissolved in the gelled aqueous fluid formed just prior to combining the amine phosphonate compound used therewith.

Various solid cellulose gelling agents can be used to gel the water including, for example, carboxymethyl cellulose, carboxymethylhydroxyethylcellulose, hydroxyethylcellulose and others. Of these, hydroxyethylcellulose is the most preferred.

The particular quantity of the cellulose gelling agent mixed with the water to form a gelled aqueous fluid usually depends on the particular viscosity of the fluid desired. Generally, the gelling agent is combined with the water in an amount in the range of from about 0.7% to about 1.2% by weight of the resulting gelled aqueous fluid to provide apparent viscosity in the range of from about 150 cp to about 170 cp at 511 $sec^{-1}$.

Examples of amine phosphonate compounds which are useful in accordance with the present invention are ethylenediaminetetra (methylenephosphonic acid), hexamethylenediaminetetra (methylenephosphonic acid) and diethyltriaminepenta (methylenephosphonic acid). Of the various amine phosphonate compounds which can be used, diethyltriaminepenta (methylenephosphonic acid) is preferred. The presence of an amine phosphonate compound in an aqueous fluid gelled with a solid cellulose gelling agent aids water entry into micro-fisheyes remaining in the fluid and disperses the gelling agent therein whereby it is hydrated.

The amine phosphonate compound is combined with and dissolved in the gelled aqueous fluid after it is formed in a general amount in the range of from about 0.1% to about 2.0% by weight of the resulting solution. A more preferred concentration range of the amine phosphonate compound in the gelled fluid is an amount in the range of from about 0.75% to about 1.25% by weight of the resulting solution. When diethyltriaminepenta (methylenephosphonic acid) dispersant is used, it is most preferably dissolved in the gelled aqueous fluid in an amount of about 1.0% by weight of the resulting solution.

The particular amount of a particular gelling agent which should be used within the above ranges for producing a gelled aqueous fluid of particular viscosity can be determined in the laboratory prior to the field preparation of the fluid using conventional techniques.

In preparing the gelled aqueous fluid, fresh water is preferably used, the pH of which has been lowered to about 3 to 4. The lowering of the pH can be accomplished by adding an acid, preferably an aqueous hydrochloric acid solution, to the water in a sufficient amount. Any conventional nonreactive additives utilized, e.g., clay stabilizing potassium chloride, are preferably added to the water prior to lowering the pH thereof. The cellulose gelling agent is next combined with the water and vigorously mixed therewith. The pH of the resulting mixture is then raised to about 7, preferably by adding a sufficient amount of a base, e.g., aqueous sodium hydroxide solution, therewith followed by continued mixing until a homogenous gelled aqueous fluid is formed. If it is desired that the gelled aqueous fluid contain salt, e.g., sodium chloride, for compatibility with the formation to be treated or other reason, such salt is preferably combined with the gelled aqueous fluid at this point.

The amine phosphonate compound used is next combined with the gelled aqueous fluid and mixed therewith. Because the addition of the amine phosphonate compound lowers the pH of the gelled aqueous fluid, its pH is again raised to about 7 to 7.5 by the addition of a sufficient amount of a base such as aqueous sodium hydroxide.

The resulting gelled aqueous fluid is substantially debris-free, and as mentioned above, it can be used without being filtered in applications where some debris can be tolerated. In those applications where the well treating fluid must be as free of debris as possible, the substantially debris-free gelled aqueous fluid formed as described above is filtered using conventional filtering equipment prior to being introduced into the subterranean formation to be treated therewith.

In using a gelled aqueous treating fluid of this invention for treating a subterranean formation penetrated by a well bore, a gelled aqueous fluid is formed and an amine phosphonate compound is combined therewith as described in detail above. The resulting substantially debris-free gelled aqueous well treating fluid is used to carry out the treatment by pumping it to the subterranean formation with or without additional materials suspended therein by way of the well bore. As described above, if the well treating fluid must be as free of debris as possible, it is filtered prior to being pumped into the subterranean formation.

In order to further illustrate the methods of the present invention, the following example is given.

EXAMPLE

Three gelled aqueous fluid test samples were prepared using water containing 2% ammonium chloride and hydroxyethylcellulose (HEC) gelling agent. The first test sample was prepared by adding the HEC gelling agent to the water in an amount of 0.95% by weight of the resulting fluid (equivalent to 80 pounds of HEC per 1000 gallons of water) followed by mixing in a low shear mixer (Waring blender at low speed) for a time period of about 1 hour.

The second test sample was prepared in the same manner as the first except that the gelled fluid obtained from the low speed mixing step was subjected to high shear mixing (Waring blender at high speed) for a time period of 1.5 minutes followed by filtering through a 10 micron filter element.

The third test sample was prepared in accordance with the present invention. That is, an amount of diethylenetriaminepenta (methylenephosphonic acid) [DETPMP] equivalent to 1% by weight of the resulting solution was dissolved in the gelled fluid obtained from the low speed mixing step described above.

Each of the three test samples were tested at room temperature (75°-80° F.) for Brookfield viscosity (Brookfield Viscometer at 0.3 rpm); apparent viscosity (Fann, Model 35A viscometer at 600, 300, 200 and 100 rpm); filterability; regained permeability; and micro-fisheye count. The filterability and regained permeability test procedures are as follows:

GEL FILTERABILITY TEST

A filter press was used to conduct this test having a cup capable of holding about 320 ml of fluid. The gel to be tested was poured to the top of the cup, thus filling it. One piece of No. 50 Whatman filter paper was placed into position in the cup. With the lid securely in place, the cup was positioned into the pressure fitting of the press assembly with the air valve closed. A graduated container was placed below the press assembly to receive the effluent gel. The air regulator in line to the filter press was adjusted to 45 psi. The air valve was opened and a timer started. Gel was allowed to flow through the device for 1, 2, 5 and 10 minute intervals at which the volumes in the graduated container were recorded.

Using the flow volumes vs. time the slope of each set of data was computed assigning time to the x axis and gel volume to the y axis. If the entire contents of the cup was emptied prior to reaching the target end time, the time of the blow-out vs. 320 ml was used as the last pair of the data points. For HEC gels, a filter rate slope volume should be 16 ml/min in order to achieve convenient field filtration and optimum fluid loss during gravel packing.

REGAINED PERMEABILITY TEST

A 2.38 cm diameter core of fired berea sandstone was cut to a length of approximately 10.0 cm. The core was then mounted in a Hassler Sleeve assembly, using 500 psi overburden pressure. The core was saturated in API brine and heated to test temperature. API brine was then injected at 20 psig differential $N_2$ or air pressure at test temperature (140° F.) through the core until a stabilized rate or permeability was reached. The core permeability was calculated at each incremental volume during the injection.

A volume of 75 ml of the gel tested was injected through the core in the opposite direction to that of the calibration brine. The differential pressure used for the gel was 200 psig. The injection rate was recorded at least three times during this phase of the test. Also, the total time required to inject the 75 ml of gel was recorded.

The third phase of the test was to again inject API brine through the core in the original direction at 20 psig differential pressure. Injection was continued until a stable rate or permeability was reached (md). This injection step was performed at the same temperature as the first two phases of the test. The percent regained permeability was calculated by $md_2/md_1 \times 100$ where:

$md_2$ = permeability during regain brine flow
$md_1$ = permeability during initial brine flow The results of the tests are set forth in the Table below as are the desired properties of an ideal or optimum gelled aqueous well treating fluid.

TABLE

| Test | Desired Range | Test Samples | | |
|---|---|---|---|---|
| | | First | Second | Third |
| Brookfield Viscosity | 5000–6800 cp. | 8000 cp. | 6500 cp. | 5800 cp. |
| Apparent Viscosity | | | | |
| @ 600 rpm. | 86–98.5 cp. | 90 cp. | 86 cp. | 92 cp. |
| @ 300 rpm. | 140–160 cp. | 148.5 cp. | 142 cp. | 152 cp. |
| @ 200 rpm. | 178–200 cp. | 193.5 cp. | 190 cp. | 205 cp. |
| @ 100 rpm. | 300–350 cp. | 309 cp. | 320 cp. | 312 cp. |
| Filterability | greater than 16 ml./min. | 12 ml./min. | 28 ml./min. | 51.4 ml./min. |
| Gel Injectivity | less than 15 Darcy min./75 ml. | 24 Darcy min./75 ml. | 8–12 Darcy min./75 ml. | 5 Darcy min./75 ml. |
| Regained Permeability | 90% or more | 69.4% | 90.95% | 90.1% |
| Micro-Fisheye Count | 30 or less | 140 | 25 | 30 |

From the Table above, it can be seen that the method of the present invention achieves the desired properties without the necessity of high shear mixing and filtering.

The present invention is thus well adapted to carry out the objects and attain the ends and advantages mentioned as well as those inherent therein. While preferred embodiments of the invention have been described, numerous changes and modifications in the methods may be made by those skilled in the art without departing from the spirit of the invention as defined by the scope of the appended claims.

What is claimed is:

1. A method of preparing a substantially debris-free gelled aqueous treating fluid comprising the steps of:
    (a) forming a gelled aqueous fluid by mixing a cellulose gelling agent with water;
    (b) combining an amine phosphonate compound with said gelled aqueous fluid in an amount sufficient to cause the hydration of unhydrated gelling agent remaining in said gelled aqueous fluid; and
    (c) raising the pH of said resulting solution to about 7 wherein the pH of said water in step (a) is lowered to about 3 to 4 prior to mixing said gelling agent therewith; and after mixing said gelling agent with said water, the pH of the mixture is raised to about 7.

2. The method of claim 1 wherein step (a) is further characterized to include continuing the mixing of said gelling agent and water after raising the pH of the mixture to about 7 for a time period sufficient to form a homogeneous gelled aqueous fluid.

3. The method of claim 1 wherein said amine phosphonate compound is combined with said gelled aqueous fluid in an amount in the range of from about 0.1% to about 2.0% by volume of the resulting solution.

4. The method of claim 1 wherein said amine phosphonate compound is diethylenetriaminepenta (methylenephosphonic acid).

5. The method of claim 4 wherein said diethylenetriaminepenta (methylenephosphonic acid) is combined with said gelled aqueous fluid in an amount of about 1.0% by volume of the resulting solution.

6. The method of claim 1 wherein said gelling agent is hydroxyethylcellulose and is mixed with said water in an amount in the range of from 0.7% to about 1.2% by weight of the resulting gelled fluid.

7. The method of claim 1 wherein said water is fresh water.

8. The method of claim 7 wherein said lowering of the pH of said water in step (a) comprises adding a sufficient quantity of hydrochloric acid to said water.

9. The method of claim 8 wherein said raising of the pH of said gelling agent-water mixture in step (a) comprises adding a sufficient quantity of sodium hydroxide to said mixture.

10. The method of claim 9 wherein the raising of the pH of the resulting solution in step (c) comprises adding a sufficient quantity of sodium hydroxide to said solution.

11. A method of preparing a substantially debris-free gelled aqueous treating fluid comprising the steps of:
    (a) lowering the pH of water about 3 to 4;
    (b) mixing hydroxyethylcellulose gelling agent with said water in an amount in the range of from about 0.7% to about 1.2% by weight of the resulting mixture;
    (c) raising the pH of the mixture formed in step (b) to about 7;

(d) continuing the mixing of the mixture formed in step (c) to form a homogeneous gelled aqueous fluid;

(e) combining an amine phosphonate compound with said gelled aqueous fluid in an amount in the range of from about 0.1% to about 2.0% by volume of the resulting mixture; and (f) raising the pH of said resulting mixture to about 7.

12. The method of claim 11 wherein said amine phosphonate compound is diethylenetriaminepenta (methylenephosphonic acid).

13. The method of claim 12 wherein said diethylenetriaminepenta (methylenephosphonic acid) is combined with said gelled aqueous fluid in an amount of about 1.0% by volume of the resulting solution.

14. The method of claim 13 wherein said water is fresh water.

15. The method of claim 14 wherein the raising of the pH in steps (c) and (f) comprises adding sufficient quantities of sodium hydroxide to said mixtures.

16. A method of treating a subterranean formation penetrated by a well bore comprising the steps of:

(a) forming a gelled aqueous fluid by mixing a cellulose gelling agent with water;

(b) combining an amine phosphonate compound with said gelled aqueous fluid in an amount sufficient to cause the hydration of unhydrated gelling agent remaining in said gelled aqueous fluid;

(c) raising the pH of said resulting solution to about 7; and (d) pumping said gelled aqueous fluid into said subterranean formation by way of said well bore wherein the pH of said water in step (a) is lowered to about 3 to 4 prior to mixing said gelling agent therewith; and after mixing said gelling agent with said water, the pH of the mixture is raised to about 7.

17. The method of claim 16 wherein said amine phosphonate compound is combined with said gelled aqueous fluid in an amount in the range of from about 0.1% to about 2.0% by volume of the resulting solution.

18. The method of claim 17 wherein said amine phosphonate compound is diethylenetriaminepenta (methylenephosphonic acid).

19. The method of claim 18 wherein said diethylenetriaminepenta (methylenephosphonic acid) is combined with said gelled aqueous fluid in an amount of about 1.0% by volume of the resulting solution.

* * * * *